2,640,803

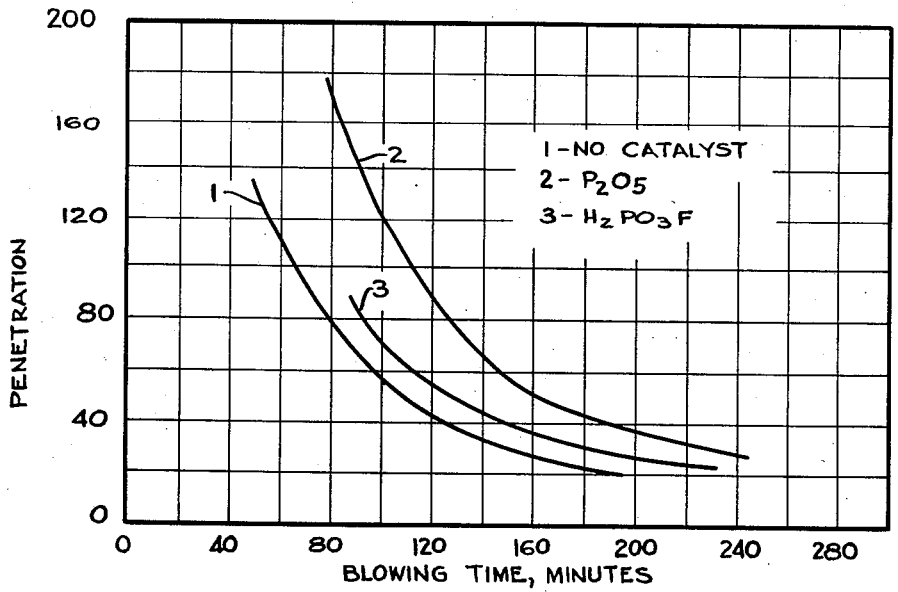
FIG. I
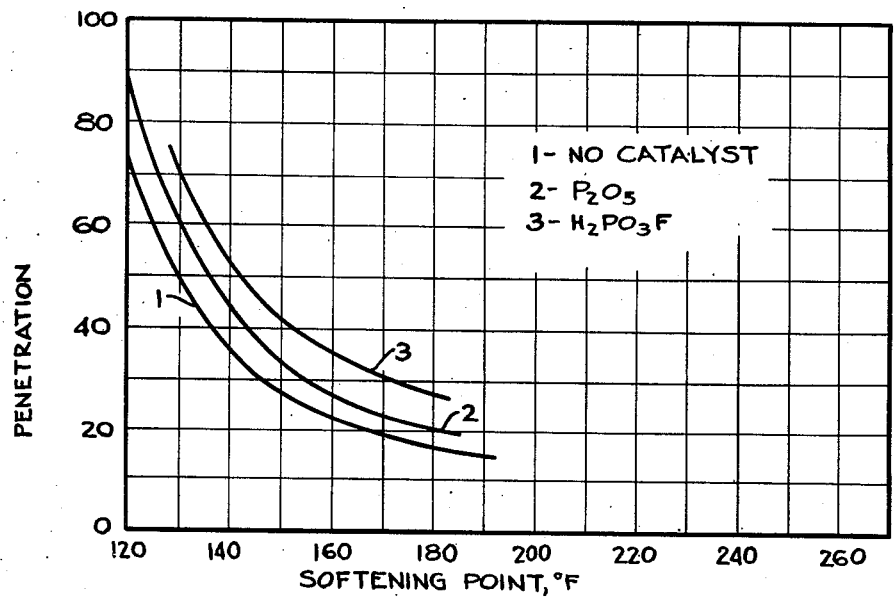
FIG. II
INVENTORS:
JOHN C. ILLMAN
HARRY J. SOMMER
BY: William H. Myers
THEIR AGENT Patented June 2, 1953

UNITED STATES PATENT OFFICE 2,640,803

PROCESS OF TREATING HIGH MOLECULAR WEIGHT HYDROCARBONS

John C. Illman, Albany, and Harry J. Sommer, Lafayette, Calif., assignors to Shell Development Company, Emeryville, Calif., a corporation of Delaware Application July 30, 1951, Serial No. 239,272

9 Claims. (Cl. 196—74)

This invention relates to a process of treating bituminous substances, and more particularly to a catalytic process for the improvement of asphalts and other pyrogenous residues.

The process of heat treating and/or oxidation of bitumens, such as asphalt, has been heretofore conducted under numerous and various reaction conditions for the purpose of improving the temperature susceptibility of the asphalt or at least for the purpose of increasing the hardness thereof. Certain catalysts have been employed, although the oxidation, such as by air blowing, may be conducted under non-catalytic conditions. In the absence of any catalyst, air-blowing at a temperature between about 400 and 550° F. for reasonably economic blowing periods, results in a decrease in penetration and an increase in "penetration index," but only to a moderate degree. Many varieties of catalysts have been employed, but only a few have been found to be desirable or particularly effective. A catalyst becomes undesirable when it reacts detrimentally either with the asphalt or with other materials eventually incorporated or in contact therewith. In order to be effective in minimum quantities and without resorting to pressure equipment, a catalyst must be relatively non-volatile at the temperature of heating and/or oxidation. Many catalysts, such as boron tri-fluoride, do not meet this requirement. Hence, in the latter case, continual addition or incorporation of the catalyst throughout the course of the heat treatment and/or oxidation becomes necessary.

One of the principal objects in the heat treatment or oxidation of bitumens, such as asphalts, is to improve their susceptibility to changes with temperature, this property being expressed as the "penetration index," which term is more fully described and defined in a paper by Pfeiffer and Van Doormaal, J. Inst. Pet. Tech., 22, 414 (1936). Two relatively efficient catalysts known and used at present for the improvement of penetration index, which catalysts are relatively non-volatile and do not leave residues of undesirable character, are ferric chloride and phosphoric acid. Ferric chloride has been found to have a continuing hardening effect on asphalt even during aging at ordinary temperatures. While these preferred catalysts improve the penetration index to a satisfactory extent, certain disadvantages occur in their use. In many asphalts, ferric chloride does not have the profound effect upon penetration index that is desired while phosphorus pentoxide often requires an increased blowing time of approximately 50% to reach a given penetration over that required in the absence of a catalyst.

It is an object of the present invention to improve the physical characteristics of asphalts and other bitumens. It is another object of this invention to improve the heat treatment and oxidation of hydrocarbons, such as asphalt. It is a further object of this invention to provide an improved catalytic process for the beneficiation improvement of asphalt properties. Other objects will become apparent during the following discussion.

Now, in accordance with this invention, it has been found that fluorinated phosphoric acids, when present during the heat treatment (including oxidation) of high molecular weight hydrocarbons, result in maximum increase in penetration index with a minimum increase in heat treating time. More particularly, it has been found that the use of catalysts of the present invention, such as monofluorophosphoric acid, as an asphalt blowing catalyst, results in a penetration index of the product which is greater than that obtainable by the use of many other known catalysts, other conditions being equal.

The class of catalytic materials with which this invention is concerned comprises the fluorinated derivatives of phosphoric acid, and especially monofluorphosphoric acid, difluorophosphoric acid and hexafluorophosphoric acid. These catalysts have been found to be effective for the present purpose especially when used in amounts varying from about 0.5% to about 5% by weight, based on the high molecular weight hydrocarbon. While the pure acids are preferred for this purpose, mixtures thereof with naturally occurring materials may be suitably treated so as to act as catalysts in accordance with this invention. Specifically, certain naturally occurring phosphate deposits containing substantial amounts of fluorine or fluoride residues may be acidified and added to asphalt as the catalyst for use in the present invention. In such case the amount of acidified fluorinated phosphate must be added in an amount so as to provide a quantity of fluorinated phosphoric acid substantially within the above recited ranges of quantity. The preferred species for use in this invention is monofluorophosphoric acid, although other species of this class are likewise effective. However, when employing such catalysts as hexafluorophosphoric acid precautions must be taken to avoid the use of glass equipment so that the etching effect due to the high concentration of any released fluorine or hydrofluoric acid will be avoided. In normal plant operations, of course, the usual equipment would be made of steel or other ferruginous material, and hence this precaution is unnecessary when using ordinary asphat treating equipment.

The asphalts suitable for the present processes and in the preparation of the present compositions are preferably those designed especially for the preparation of roofing asphalts and the like. These preferably should contain a minimum amount of hydrocarbon waxes, but may contain high molecular weight petroleum hydrocarbons, such as heavy lubricating oils, preferably in addition to those materials usually regarded as asphaltic in character or derivation. Hence, the invention especially applies to pyrogenous residues and particularly to residual asphalts, but may be applied as well to other bituminous substances such as naturally occurring asphalts and asphaltites, such as compositions containing gilsonite and the like.

In the preparation of the present compositions, two alternative processes may be employed. Broadly speaking, the invention applies to the catalytic heat treatment of asphalt-like bituminous materials either in the presence or absence of free oxygen. It is a preferred practice to utilize the present catalysts in an air-blowing operation to produce asphalts having the properties obtained by blowing air through a residual oil, especially when the production of high quality roofing asphalts is required. However, for the preparation of paving grade asphalts having an unusually increased adherence to aggregates the catalysts may be employed in a heat treatment (at elevated temperatures) of the asphalt wherein oxidation does not take part. In preparing asphalts having high penetration indices it is a preferred practice to inject the subject catalysts into a melted asphalt and thereafter blow the asphalt with air or other oxygen-containing gas at a temperature between about 400° F. and about 550° F., although higher or lower temperatures may also be used. This temperature is preferably maintained within the range from about 450° F. to about 525° F. Dependent upon equipment and the characteristics of the final product which are desired, the blowing time is usually between about 30 minutes and about 24 hours, and normally requires from about 4 to about 12 hours. As the working examples given hereinafter will show, treatment of asphalts under these conditions produces a product having a higher penetration index than can be obtained under similar conditions when using catalysts such as phosphorus pentoxide. Moreover, the data show that in arriving at this improved product the increase in blowing time required to reach a given penetration over non-catalytic air blowing is substantially less than that required when using catalysts such as phosphorus pentoxide, or the like. The economic implications of this improvement are a substantial reduction in plant operation costs and a marked improvement in product quality. Both of these results are prerequisites of an improved economic process.

In addition to improving the penetration index at a minimum expense of time the product so obtained possesses an added unexpected feature. Adherence of roofing granules and the like to the thus-treated asphalts may be promoted, due apparently to bonds created between the fluorine radical(s) of the catalyst and the silica-containing constituents of the roofing granules. This feature results in substantially improved useful life of roofing materials produced with catalytically blown asphalts prepared according to the present invention. It will be understood that the above theory postulated as the governing reason for improvement in adherence of roofing granules is not to be a limitation on the present invention, but is merely suggested as a possible explanation for the superiority of the present products.

For the preparation of roofing asphalts and similar products of low temperature susceptibility, an air-blowing operation or its equivalent is necessary. However, such a treatment is not required and may even be undesirable when the purpose is to produce paving grade asphalts. The latter products having substantially greater penetration and lower softening points than roofing grade asphalts, may, however, be treated to produce improved products exhibiting enhanced adhesion characteristics. Thus, in accordance with this phase of the present invention, asphalts may be heat-treated substantially in the absence of air but in the presence of one or more of the above-described fluorinated phosphoric acids at elevated temperatures normally within the temperature range of from about 400° F. to about 550° F. for a period of between about 30 minutes and about 24 hours. Under these circumstances, a product is obtained which does not have a substantially altered temperature susceptibility or softening point, but which exhibits materially improved adhesion toward paving graded aggregates. This may be promoted if the asphalt (or like pyrogenous residue) is heat-treated in the presence of a fluorinated phosphoric acid, and also contains a minor amount of a hydrophobic surface-active agent. These so-called "adhesion agents" are well known in the asphalt art and are usually anionic or cationic materials. Their purpose is to minimize the action of water in stripping asphalt from aggregate surfaces. While the exact action in the present invention is still obscure, it appears probable (when using a cationic agent) that the fluorinated phosphoric acid forms a salt with the surface-active agent and in turn is similarly bonded throughout the fluorine radical to the silica constituents of the mineral aggregates. By means of this chain-like bond, substantially improved adhesion characteristics must result. Surface-active agents especially useful in this connection are high molecular weight aliphatic amines having at least about 10 carbon atoms per molecule. These amines may be unsubstituted fatty amines or aliphatic polyalkylene polyamines, aliphatic amido amines, hydroxy amines and hydroxy amido amines. Typical species coming within this class of materials include octadecylamine, heptadecylamine, hydroxy ethyl ethylenediamine, tetraethylene pentamine and derivatives formed by the condensation of monohaloepoxyalkanes with ammonia or low molecular weight primary or secondary amines. A typical species of the latter class comprises the condensation product of epichlorohydrin and ammonia which is in turn treated with a higher fatty acid or other hydrophobic acid to produce partial amides of the mixture of hydroxy polyamine products. Materials of the latter class are fully described in U. S. Patents 2,346,930; 2,386,867; 2,361,488 and 2,339,853. In the present compositions, it is preferred practice to incorporate between about 0.25% and about 5% by weight of the asphalt of the surface-active agent.

The examples which follow illustrate the process and products of the present invention:

EXAMPLE I

An asphalt reduced from a Mid-Continent crude oil and having an initial softening point of 92° F. was air blown at a temperature of about 480° F. Samples were removed at various intervals and tested for penetration and softening point. A parallel set of samples was obtained from the same asphalt treated under the same conditions without addition of 1.5% by weight of monofluorophosphoric acid. The table below illustrates typical data obtained during this set of experiments. For the purpose of comparison, data is also included showing the result of treating the same asphalt under the same conditions with an equivalent amount of phosphorus pentoxide. The table shows that the penetration index was increased to a maximum extent by the use of monofluorophosphoric acid. In obtaining this desirable result, the talbe also indicates that a minimum amount of additional time was required to reach a given penetration as compared with the unduly lengthened period required when phosphorus pentoxide was present:

*Table*

| Catalyst | Penetration at 180° F. S. P. | Penetration Index | Time to Reach 60 Penetration, minutes |
|---|---|---|---|
| None | 17 | 2.2 | 95 |
| $P_2O_5$ | 20 | 2.5 | 147 |
| $H_2PO_3F$ | 28 | 3.2 | 112 |

Figures I and II are graphs of the results obtained in this set of experiments. Figure I comprises curves obtained by plotting blowing time required to reach a given series of penetrations. Examination of this figure will show that the use of monofluorophosphoric acid required little more blowing time to reach any penetration than was necessary when no catalyst was present. Figure II comprises curves of softening point versus penetraton obtained on samples withdrawn from the blowing apparatus at periodical intervals. This graph proves that monofluorophosphoric acid exhibits the most desirable changes in these two properties as compared with phosphorus pentoxide or with asphalts containing no catalyst.

EXAMPLE II

When asphalts are blown in the presence of about 1% hexafluorophosphoric acid using steel blowing equipment at a temperature of about 500° F. for a period of about 2.5 hours products are obtained which have penetration indices of about 3.0 to 3.2 as compared with a penetration index of about 2.5 obtained under similar circumstances when using 1% phosphorus pentoxide.

EXAMPLE III

One of the products obtained from the series of experiments described in Example I and having an ASTM penetration of 60 is modified by the addition of 1% octadecylamine and used for the coating of roofing granules. When panels of the above constituents are exposed to weathering conditions and compared at the same time with panels of non-catalytically blown asphalts, it will be found that a substantially greater proportion of roofing granules is remaining in an adhered condition to the asphalt at the end of the weathering period.

EXAMPLE IV

A southern California asphalt comprising 20% of asphalt from Coalinga crude and 80% from Mt. Poso crude is heated for one hour at 480° F. in a nitrogen atmosphere in the presence of 1.5% monofluorophosphoric acid. The final product had a softening point of 112° F. and an ASTM penetration of 112. Paving aggregates were coated with the asphalt thus treated which had been diluted with a cutback oil to give the consistency of a medium curing asphalt. A parallel set of tests of adhesion to aggregate in the presence of water were performed on an untreated portion of the same mixtures of asphalts. It was found that the samples comprising asphalt heat-treated in the presence of monofluorophosphoric acid caused the retention of more than double the amount of asphalt on the aggregate surfaces as was experienced with the compositions comprising untreated asphalt. The aggregates employed in these experiments were rhyolite derived from a California source and another rhyolite from a Massachusetts source. In both instances, approximately the same degree of improvement was obtained.

We claim as our invention:

1. The process which comprises blowing an asphalt in the presence of from about 0.5% to about 5% by weight of hexafluorophosphoric acid at a temperature between about 450° F. and 525° F. for a period between about 4 hours and about 12 hours with a gaseous stream containing free oxygen.

2. The method of treating an asphalt which comprises blowing said asphalt in the presence of from about 0.5% to about 5% by weight of difluorophosphoric acid with a gaseous stream containing free oxygen while said hydrocarbon is at an elevated temperature of the order of about 400° F. to about 550° F. for a period between about 4 hours and about 12 hours.

3. The method of treating an asphalt which comprises blowing said asphalt in the presence of from about 0.5% to about 5% by weight of monofluorophosphoric acid with a gaseous stream containing free oxygen while said hydrocarbon is at an elevated temperature of the order of about 400° F. to about 550° F. for a period between about 4 hours and about 12 hours .

4. The method of treating an asphalt which comprises blowing said asphalt in the presence of a minor amount of monofluorophosphoric acid with a gaseous stream containing free oxygen while said hydrocarbon is at an elevated temperature of the order of about 400° F. to about 550° F. for a period between about 4 hours and about 12 hours.

5. The method of treating an asphalt which comprises blowing said asphalt in the presence of a minor amount of monofluorophosphoric acid with a gaseous stream containing free oxygen while said hydrocarbon is at an elevated temperature of the order of about 400° F. to about 550° F.

6. The method of treating an asphalt which comprises blowing said asphalt in the presence of a minor amount of a fluorinated phosphoric acid with a gaseous stream containing free oxygen while said asphalt is at an elevated temperature of the order of 400° F. to 550° F.

7. The method of treating a hydrocarbon of high molecular weight to produce an asphaltic product which comprises blowing said hydrocarbon in the presence of added portions of a fluorinated phosphoric acid with a gaseous stream containing free oxygen while said hydrocarbon is at an elevated temperature of the order of 400° F. to about 550° F. for a period between about ½ hour and about 24 hours.

8. The method of treating a hydrocarbon of high molecular weight to produce an asphaltic product which comprises blowing said hydrocarbon in the presence of added portions of a fluorinated phosphoric acid with a gaseous stream containing free oxygen while said hydrocarbon is at an elevated temperature of the order of 400° F. to about 550° F.

9. The method of treating a bituminous material to produce a bituminous product which comprises heating said material in the presence of added portions of a fluorinated phosphoric acid at a temperature of the order of about 400° F. to about 550° F.

JOHN C. ILLMAN.
HARRY J. SOMMER.

References Cited in the file of this patent

UNITED STATES PATENTS

| Number | Name | Date |
| --- | --- | --- |
| 2,121,437 | McConnell | June 21, 1938 |
| 2,281,728 | Thelen | May 5, 1942 |
| 2,409,248 | Brooks et al. | Oct. 15, 1946 |
| 2,438,318 | Johnson | Mar. 23, 1948 |
| 2,508,428 | Smith | May 23, 1950 |
| 2,508,431 | Smith | May 23, 1950 |
| 2,508,924 | Mertens | May 23, 1950 |

OTHER REFERENCES

Abraham: "Asphalts and Allied Substances," 4th ed., page 1150, pub. by D. Van Nostrand Co., N. Y., N. Y. (1938).